(12) United States Patent
Camirand et al.

(10) Patent No.: US 11,992,955 B2
(45) Date of Patent: May 28, 2024

(54) ROBOTIC SPEARING DEVICE FOR PERFORMING ITEM CAPTURE AND SORTING, SPEARING END EFFECTOR AND METHOD FOR PERFORMING SAME

(71) Applicants: Waste Robotics Inc., Trois-Rivières (CA); Patrick Dionne, Rimouski (CA)

(72) Inventors: Eric Camirand, Trois-Rivieres (CA); Michel Laforest, Levis (CA); Pier Grenon, Trois-Rivieres (CA); Nicolas Belanger, El Dorado Hills, CA (US); Jean-Pierre Thibodeau, Montreal (CA); Frederic Martin, Saint-Etienne-des-Gres (CA)

(73) Assignee: Waste Robotics Inc., Quebec (CA)

( * ) Notice: Subject to any disclaimer, the term of this patent is extended or adjusted under 35 U.S.C. 154(b) by 525 days.

(21) Appl. No.: 17/238,940

(22) Filed: Apr. 23, 2021

(65) Prior Publication Data
US 2021/0308868 A1  Oct. 7, 2021

Related U.S. Application Data

(63) Continuation of application No. PCT/CA2019/051501, filed on Oct. 23, 2019.
(Continued)

(51) Int. Cl.
*B25J 15/00* (2006.01)
*B25J 9/16* (2006.01)

(52) U.S. Cl.
CPC ........... *B25J 9/1679* (2013.01); *B25J 9/1697* (2013.01); *B25J 15/0071* (2013.01)

(58) Field of Classification Search
CPC .... B25J 9/1697; B25J 9/1679; B25J 15/0071; B25J 19/023; B25J 19/025; B25J 18/06;
(Continued)

(56) References Cited

U.S. PATENT DOCUMENTS 2,500,647 A   3/1950  Schulthess
2,695,188 A   11/1954 Klausman et al.
(Continued)

FOREIGN PATENT DOCUMENTS

DE  102005017943  11/2006
ES  1064085       2/2007
(Continued)

OTHER PUBLICATIONS

Morrison et al., Cartman: The Low-Cost Cartesian Manipulator that Won the Amazon Robotics Challenge, 2018, IEEE, p. 7757-7764 (Year: 2018).*
(Continued)

*Primary Examiner* — McDieunel Marc
(74) *Attorney, Agent, or Firm* — Levine Bagade Han LLP

(57) ABSTRACT

A spearing end effector for a robotic spearing device capturing and sorting a selected item from a mass of items and having a robotic manipulator with the spearing end effector mounted at an end thereof. The robotic spearing device comprises: a spearing end effector body; a spike; a linear actuator having the spike mounted thereon; and a propeller. The spike is configurable between a retracted configuration where it is entirely located inside the spearing end effector body and an extended configuration where it extends outwardly from therefrom. The spike is engageable to the selected item when configured in the extended configuration. The linear actuator is movable to configure the spike between the retracted configuration and the extended configuration. The propeller is selectively activatable to propel the selected item in a propelling direction during an ejection of the selected item from the spearing end effector.

14 Claims, 3 Drawing Sheets

Related U.S. Application Data

(60) Provisional application No. 62/749,414, filed on Oct. 23, 2018.

(58) Field of Classification Search
CPC .. B25J 9/1635; B07C 5/36; B07C 2501/0063; G05B 2219/40064
See application file for complete search history.

(56) References Cited

U.S. PATENT DOCUMENTS

| | | | |
|---|---|---|---|
| 2,767,701 A | 10/1956 | Schwartz et al. | |
| 3,183,031 A | 5/1965 | Haberstick | |
| 3,746,099 A | 7/1973 | Black | |
| 3,873,143 A | 3/1975 | Foust | |
| 4,081,192 A | 3/1978 | Jones | |
| 4,183,570 A | 1/1980 | Broyles et al. | |
| 4,502,722 A | 3/1985 | Rocquin | |
| 4,655,495 A | 4/1987 | Naff, Jr. | |
| 4,909,554 A | 3/1990 | Pacione | |
| 5,273,329 A | 12/1993 | Wessel | |
| 5,370,433 A | 12/1994 | Yost | |
| D376,524 S | 12/1996 | Miller et al. | |
| 5,642,911 A | 7/1997 | Gatch | |
| 5,784,872 A | 7/1998 | Sadler | |
| 6,022,060 A | 2/2000 | Early | |
| 6,516,248 B2* | 2/2003 | McGee | B25J 9/1692 318/560 |
| 6,597,971 B2* | 7/2003 | Kanno | B25J 9/1666 901/7 |
| 6,634,163 B2 | 10/2003 | Kill | |
| 6,678,583 B2* | 1/2004 | Nasr | H01L 21/67769 414/217 |
| 7,181,314 B2* | 2/2007 | Zhang | B25J 9/1687 414/754 |
| 7,313,464 B1* | 12/2007 | Perreault | B25J 9/1666 700/262 |
| 7,353,082 B2* | 4/2008 | Pretlove | G05B 19/42 700/264 |
| 7,580,773 B2* | 8/2009 | Hariki | B65G 47/1457 714/24 |
| 8,095,237 B2* | 1/2012 | Habibi | B25J 9/1692 318/568.13 |
| 8,180,487 B1* | 5/2012 | Vangal-Ramamurthy | B25J 9/1692 318/567 |
| 9,435,089 B1 | 9/2016 | Diaz | |
| 9,850,574 B2* | 12/2017 | Kim | C23C 16/401 |
| 2005/0082854 A1 | 4/2005 | Barr | |
| 2015/0232992 A1* | 8/2015 | Kim | H01L 21/02348 427/553 |

FOREIGN PATENT DOCUMENTS

| | | |
|---|---|---|
| RU | 2423192 | 7/2011 |
| RU | 2651849 | 4/2018 |

OTHER PUBLICATIONS

Zhu et al., Strategy-based robotic item picking from shelves, 2016, IEEE, p. 2263-2270 (Year: 2016).*

Bley et al., Mobile Manipulation Based on Generic Object Knowledge, 2006, IEEE, p. 411-416 (Year: 2006).*

Correll et al., Analysis and Observations From the First Amazon Picking Challenge, 2018, IEEE, p. 172-188 (Year: 2018).*

* cited by examiner

ROBOTIC SPEARING DEVICE FOR PERFORMING ITEM CAPTURE AND SORTING, SPEARING END EFFECTOR AND METHOD FOR PERFORMING SAME

CROSS-REFERENCE TO RELATED APPLICATIONS

This application is a continuation of PCT Patent Application No. PCT/CA2019/051501 filed on Oct. 23, 2019, which claims the benefit of U.S. Provisional Patent Application No. 62/749,414 filed on Oct. 23, 2018, the contents of which are hereby incorporated by reference in their entireties.

TECHNICAL FIELD OF THE INVENTION

The present invention relates to the field of automated capture and sorting of items. More particularly, it relates to a robotic spearing device configured to perform automated capture and sorting of selected items in a mass of items, to a spearing device for performing the above-mentioned capture and sorting of the selected items from the mass of items and to a method for performing the above-mentioned capture and sorting of the selected items from the mass of items.

BACKGROUND

Manual sorting of items according to different item categories, for example and without being limitative, in a waste recycling facility, has always been a challenge.

Historically, sorting has been performed manually by workers using their judgment to identify the items of different categories and using their hands to manipulate the items and perform the sorting. For example and without being limitative, the workers identified items being part of selected categories (such as for example and without being limitative, paper, plastic, glass or the like—or subcategories thereof), grabbed the identified items and tossed the items in a receptacle corresponding the specific item category.

More recently, apparatuses and devices for performing the automated sorting of items from a mass of items have also been used to sort selected items, in the above-mentioned waste recycling facilities. Such apparatuses include, for example and without being limitative: sieves and screens using selected aperture sizes to sort the items; ballistic separators using the physical properties of the items to perform separation and sorting of the items based on the distinctive behavior of the items of each category when set into motion; and optical sorters combining machine vision to identify selected items and ejectors, such as air ejectors, to project the selected items from the mass of items and perform the sorting thereof.

Even more recently, robotic systems including a combination of machine vision to identify selected items and robotic manipulators for capturing the items from the mass of items, displacing the items and subsequently releasing the items at the desired location, have also been used. In more details, known robotics manipulators used in such robotic systems commonly include one of a grappling fixture end effector or a vacuum end effector to perform the capture of the identified item from the mass of items and the subsequent release of the item, to complete the sorting operation.

Robotic systems tend to offer performance advantages over manual sorting, conventional mechanical systems (such as sieves and screens or ballistic separators) and optical sorters. Such advantages include a consistent sorting efficiency and a greater flexibility to sort multiple objects using a single machine or method. Known robotic systems, however, also suffer from several drawbacks. Amongst others, grappling fixture end effectors commonly used therein are complex and fragile mechanical components which require grapple positioning, orientation and precision, thereby increasing the complexity of operation of the overall machine. On the other hand, vacuum end effectors (which are the known alternative to grappling fixture end effectors) are commonly prone to clogging and often underperform in the capture of items having irregular surfaces, as a result of inadequate vacuum force on such surfaces.

In view of the above, there is a need for an improved robotic spearing device for performing item capture and sorting and for an improved method for performing the same, which would be able to overcome or at least minimize some of the above-discussed prior art concerns.

SUMMARY OF THE INVENTION

According to a first general aspect, there is provided a spearing end effector for a robotic spearing device for performing capture and sorting of a selected item from a mass of items and having a robotic manipulator with the spearing end effector mounted at an end thereof. The robotic spearing device comprises: a spearing end effector body; at least one spike; at least one linear actuator having the at least one spike mounted thereon; and a propeller. The at least one spike is configurable between a retracted configuration where the spike is entirely located inside the spearing end effector body and an extended configuration where the spike extends outwardly from the spearing end effector body. The at least one spike is engageable to the selected item when configured in the extended configuration. The at least one linear actuator is movable to configure the at least one spike between the retracted configuration and the extended configuration. The propeller is selectively activatable to propel the selected item in a propelling direction during an ejection of the selected item from the spearing end effector.

In an embodiment, the propeller is configurable between an inactive configuration where the propeller is positioned not to impede the engagement of the spike with the selected item and an active configuration where the propeller is positioned to propel the selected item in the propelling direction.

In an embodiment, the spearing end effector body comprises an item release surface engageable to the selected item engaged to the at least one spike, when the spike is moved from the extended configuration and towards the retracted configuration.

In an embodiment, the propeller comprises a propeller outlet positionable proximate to the item release surface.

In an embodiment, the propeller uses one of a compressed air jet and a mechanical pusher to propel the selected item engaged to the at least one spike in the propelling direction.

In an embodiment, there is also provided a robotic spearing device in combination with the spearing end effector described above. The robotic spearing device comprises a robotic manipulator having a spearing end effector mounted at an end thereof; a machine vision system configured to acquire images of the mass of items, to process the images acquired to identify the selected item from the mass of items and to determine the position of the selected item; and an electronic control system in data communication with the machine vision system and the manipulator, the electronic control system receiving data relative to the position of the selected item from the machine vision system and controlling the manipulator to move the manipulator and position the spearing end effector thereof to allow engagement of the spike of the end effector with the selected item when the spike is configured from the retracted configuration towards the extended configuration.

In an embodiment, the mass of items is in motion and the electronic control system is configured to displace the spearing end effector simultaneously and synchronously with the mass of items, at least during a time period where engagement of the spike of the spearing end effector with the selected item is performed.

In accordance with another general aspect, there is also provided a robotic spearing device for performing capture and sorting of a selected item from a mass of items. The robotic spearing device comprises a robotic manipulator having a spearing end effector mounted at an end thereof, a machine vision system and an electronic control system in data communication with the machine vision system and the manipulator. The machine vision system is configured to acquire images of the mass of items, to process the images acquired to identify the selected item from the mass of items and to determine the position of the selected item. The electronic control system receives data relative to the position of the selected item from the machine vision system and controls the manipulator to move the manipulator and position the spearing end effector thereof to allow engagement of the spike of the end effector with the selected item, when the spike is configured from the retracted configuration towards the extended configuration. The spearing end effector comprises a spearing end effector body; at least one spike and at least one linear actuator having the at least one spike mounted thereon. The at least one spike is configurable between a retracted configuration where the spike is entirely located inside the spearing end effector body and an extended configuration where the spike extends outwardly from the spearing end effector body. The at least one spike is engageable to the selected item when configured in the extended configuration. The at least one linear actuator is movable to configure the at least one spike between the retracted configuration and the extended configuration.

In an embodiment, the mass of items is in motion and the electronic control system is configured to displace the spearing end effector simultaneously and synchronously with the mass of items, at least during a time period where engagement of the spike of the spearing end effector with the selected item is performed.

In an embodiment, the spearing end effector further comprises a propeller selectively activatable to propel the selected item in a propelling direction, during an ejection of the selected item from the spearing end effector.

In an embodiment, the propeller is configurable between an inactive configuration where the propeller is positioned not to impede the engagement of the spike with the selected item and an active configuration where the propeller is positioned to propel the selected item in the propelling direction.

In an embodiment, the spearing end effector body comprises an item release surface engageable to the selected item engaged to the at least one spike, when the spike is moved from the extended configuration and towards the retracted configuration.

In an embodiment, the propeller comprises a propeller outlet positionable proximate to the item release surface.

In an embodiment, the propeller uses one of a compressed air jet and a mechanical pusher to propel the selected item in the propelling direction.

In accordance with another general aspect, there is further provided a method for performing capture and sorting of a selected item from a mass of items. The method comprises: positioning a spearing end effector of a manipulator proximate to the selected object; impaling the selected item with a spike of the spearing end effector of the manipulator; extracting the selected item from the mass of items by moving the spearing end effector with the selected item impaled thereon; and ejecting the selected item in a corresponding sorting receptacle. The step of ejecting the selected item comprises retracting the spike in a retraction direction and activating a propeller propelling the selected item in a propelling direction.

In an embodiment, the spearing end effector has a spearing end effector body with an item release surface and the step of positioning the spearing end effector of the manipulator proximate to the selected object comprises abutting the item release surface of the spearing end effector body on a surface of the selected item.

In an embodiment, the step of ejecting the selected item further includes abutting the selected item onto the item release surface of the spearing end effector body, as the spike is being retracted in the retraction direction.

In an embodiment, the step of ejecting the selected item in a corresponding sorting receptacle comprises moving the propeller from an inactive configuration to an active configuration.

In an embodiment, the step of activating the propeller propelling the selected item in the propelling direction comprises activating a compressed air jet propelling the selected item.

In an embodiment, the step of activating the propeller propelling the selected item in the propelling direction comprises activating a mechanical pusher propelling the selected item.

In an embodiment, the method further comprises further comprising the initial steps of: identifying the selected item in the mass of items; determining the position of the selected item; and positioning the spearing end effector according to the position of the selected item, to allow subsequent impaling of the selected item with the spike of the spearing end effector with minimal impact on the neighboring items of the mass of items.

In accordance with another general aspect, there is also provided a method for performing capture and sorting of a selected item from a mass of items. The method comprises: identifying the selected item in the mass of items; determining the position of the selected item; positioning a spearing end effector according to the position of the selected item to allow subsequent impaling of the selected item with a spike of a spearing end effector of a manipulator, with minimal impact on the neighboring items of the mass of items; impaling the selected item with the spike of the spearing end effector of the manipulator; extracting the selected item from the mass of items by moving the spearing end effector with the selected item impaled thereon; and ejecting the selected item in a corresponding sorting receptacle.

In an embodiment, the spearing end effector includes a spearing end effector body and the step of ejecting the selected item in the corresponding sorting receptacle comprises retracting the spike in the spearing end effector body and activating a propeller propelling the selected item in a propelling direction.

In an embodiment, the step of positioning the spearing end effector according to the position of the selected item comprises abutting the item release surface of the spearing end effector body on a surface of the selected item.

In an embodiment, the step of ejecting the selected item further includes abutting the selected item onto an item release surface of the spearing end effector body, as the spike is being retracted in the spearing end effector body.

In an embodiment, the step of activating a propeller propelling the selected item in a propelling direction comprises moving the propeller from an inactive configuration to an active configuration.

In an embodiment, the step of activating the propeller propelling the selected item in the propelling direction comprises activating a compressed air jet propelling the selected item.

In an embodiment, the step of activating the propeller propelling the selected item in the propelling direction comprises activating a mechanical pusher propelling the selected item.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the robotic spearing device or the spearing end effector for the robotic spearing device and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the robotic spearing device or the spearing end effector for the robotic spearing device, as will be briefly explained herein and as can be easily inferred herefrom by a person skilled in the art. Moreover, it will be appreciated that positional descriptions such as "above", "below", "left", "right", "forward", "rearward", "front", back" and the like should, unless otherwise indicated, be taken in the context of the figures and should not be considered limiting.

Moreover, although the associated method includes steps as explained and illustrated herein, not all of these steps are essential and thus should not be taken in their restrictive sense. It will be appreciated that the steps of the method for performing item capture and sorting described herein may be performed in the described order, or in any suitable order.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Figure 1:
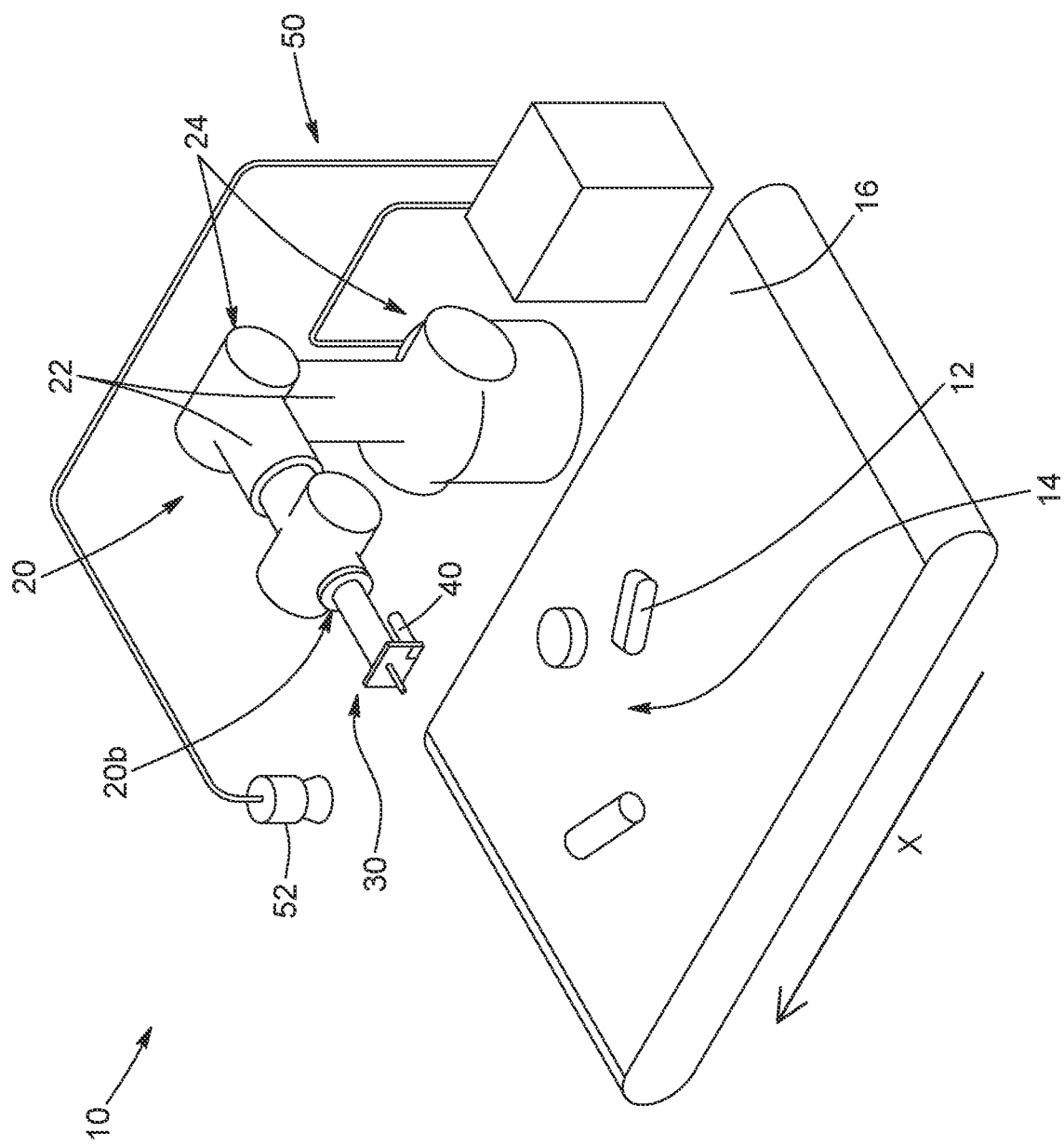
FIG. 1 is a perspective schematic representation of a robotic spearing device for performing item capture and sorting, in accordance with an embodiment of the invention and shown in combination with a conveyor belt having a mass of items conveyed thereon.

Referring generally to FIG. 1, in accordance with one embodiment, there is provided a robotic spearing device 10 configured to perform capture and sorting of a selected item (or object) 12 from a mass (or group) of items 14. As will be described in more details below, in an embodiment, the robotic spearing device 10 is configured to perform the capture of the selected item 12 by spearing thereof and can perform subsequent ejection of the selected item 12 into a sorting receptacle (not shown). For example, in an embodiment, the sorting receptacle (not shown) can be associated to an item category for the selected item 12. In other words, in an embodiment, the robotic spearing device 10 is configured to capture the selected item 12, by impaling the item 12 on a spike 32, to extract the item 12 from a static or moving mass of randomly distributed items 14 and to subsequently eject the selected items 12 into a corresponding sorting receptacle (not shown).

One skilled in the art will understand that the selected item 12 is generally an item having no other item positioned above in the mass of items 14 (i.e. an item positioned on a first layer of the pile of items when viewed from above), and which can therefore be extracted without displacement of the adjacent items in the mass of items 14, if removed carefully therefrom.

For ease of description, in the course of the present description, the term "selected item" is used in the singular form. One skilled in the art will however understand that, the use of the singular is not restrictive and that the robotic spearing device 10 can be used to simultaneously capture a plurality of selected items 12 by spearing thereof and perform the subsequent ejection of the plurality of selected items 12 into the sorting receptacle (not shown) and/or that the robotic spearing device 10 can be used to repeatedly capture selected items 12 by spearing thereof and perform the subsequent ejection of the plurality of selected items 12 into the sorting receptacle (not shown).

In an embodiment, the robotic spearing device 10 includes a spearing end effector 30 mounted at a distal end of a robotic manipulator 20. The spearing end effector 30 of the manipulator 20 of the robotic spearing device 10 is specifically designed to perform efficient capture, displacement and release of the selected item 12 and therefore minimize the cycle time required for the capture, displacement and release of the selected item 12. In view of the above, one skilled in the art will understand that the present invention is directed to both the robotic spearing device 10 and the spearing end effector 30 of the robotic spearing device 10 which provides numerous advantages over known end effectors for performing the tasks mentioned hereinabove.

In the course of the present description, the term "robotic manipulator" is used to refer to any combination of links 22 and joints 24 together defining a structure capable of automatically capturing and moving the selected item 12 within a given number of degrees of freedom. In view of the above, one skilled in the art will understand that, in an embodiment, the robotic manipulator 20 can be a robot of the robotic arm type, such as, for example and without being limitative, an articulated robot, a Cartesian robot, a cylindrical robot, a polar robot, a SCARA robot, a parallel robot, a delta robot, a six-axis robot, or the like. One skilled in the art will however understand that, in alternative embodiments (not shown), the robotic manipulator 20 could also be of a different type which provides the necessary degrees of freedom (e.g. between 1 degree of freedom and 6 degrees of freedom) to position the spearing end effector 30 to impale the selected item 12 with the spike 32 thereof, retract the selected item 12 from the mass of items 14 and position the spearing end effector 30, with the selected object engaged thereto, to release the selected item 12 in a corresponding sorting receptacle (not shown).

Figure 2A:
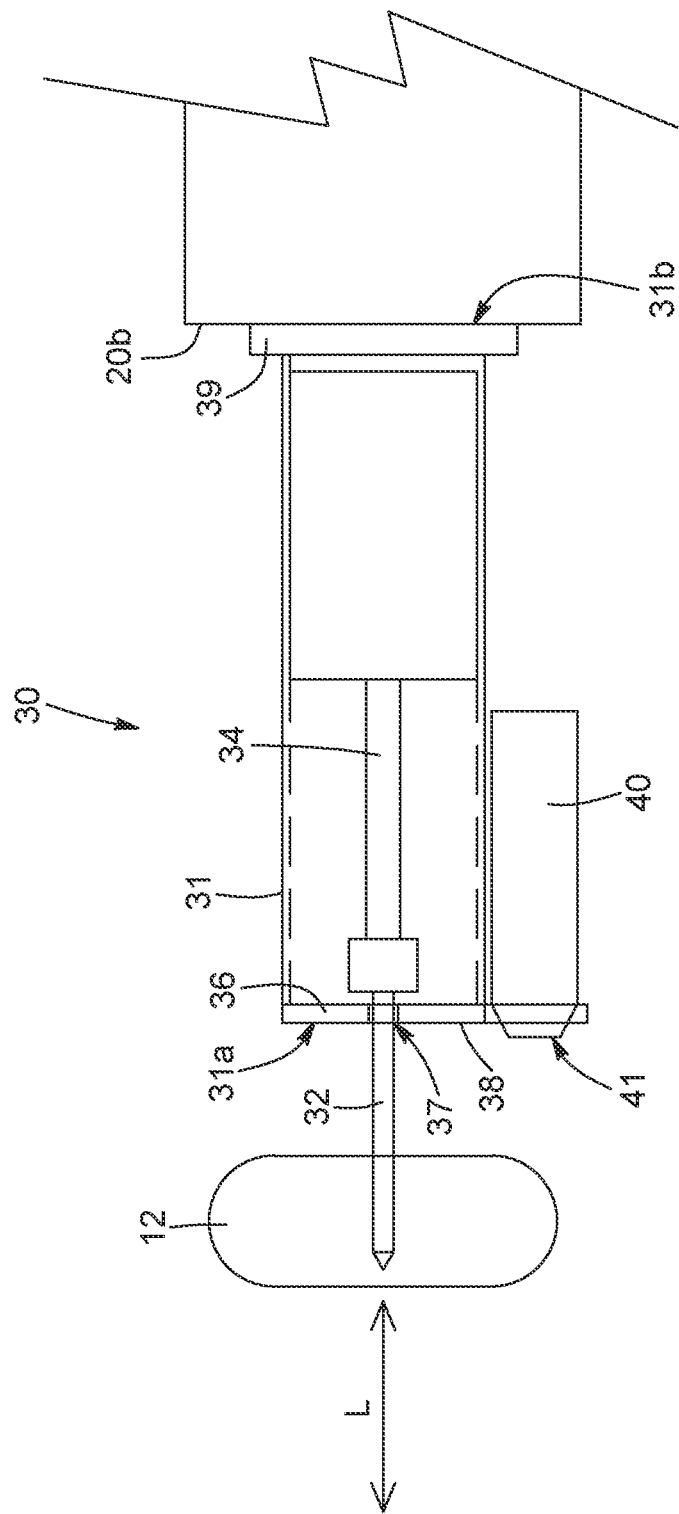
FIGS. 2A and 2B show a cross-sectional schematic representation of a spearing end effector of the manipulator of the robotic spearing device of FIG. 1, FIG. 2A showing the spearing end effector with a spike thereof in an extended configuration and a selected item impaled thereon and FIG. 2B showing the spearing end effector with the spike in a retracted configuration and the selected item being ejected and propelled by a propeller of the robotic spearing device.
Figure 2B:
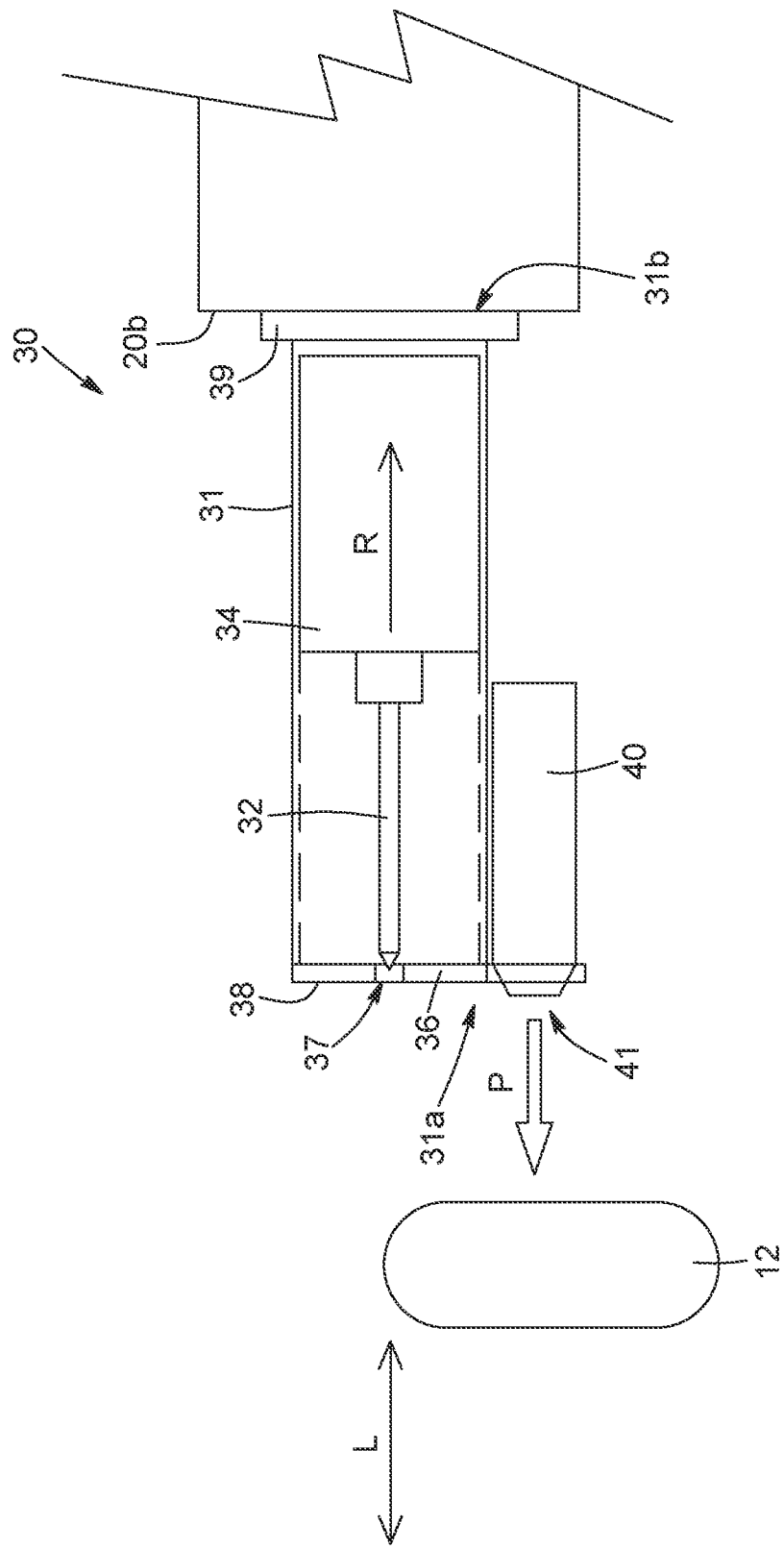

Referring to FIGS. 1, 2A and 2B, in the embodiment shown, the spearing end effector 30 includes a spearing end effector body 31 and a linearly movable spike 32. The spike 32 is mounted to a linear actuator 34 for moving the spike 32 between a retracted configuration (see FIG. 2B) where the spike 32 is entirely located inside the spearing end effector body 31 and an extended configuration (see FIG. 2A) where the spike 32 extends at least partially outside of the spearing end effector body 31. As will be understood by one skilled in the art, the spike 32 is a substantially thin elongated member having a pointed end and made of a rigid material such as, for example and without being limitative, metal, hard plastic, composite material, or the like. The spike 32 extends along a longitudinal axis L and is engageable to the selected item 12, by spearing of the selected item 12, when configured in the extended configuration.

In an embodiment, the spike 32 can have an outer surface designed to increase the friction between the spike 32 and the selected item 12 engageable therewith, to help maintain the selected item 12 engaged to the spike 32. For example and without being limitative, the outer surface of the spike 32 can be a rugged surface, a corrugated surface, a ribbed surface, a surface having multiple teeth defined therein, etc., to provide the desired friction with the item 12.

The linear actuator 34 is positioned inside the spearing end effector body 31 with the spike being mounted thereon. One skilled in the art will understand that the linear actuator 34 can be of any type allowing linear actuation of the spike 32 (i.e. any type allowing linear movement to configure the spike 32 between the retracted configuration and the extended configuration), such as, for example and without being limitative, a mechanical actuator, a hydraulic actuator, a pneumatic actuator a piezoelectric actuator, or the like.

In the embodiment shown, the spearing end effector 30 includes a single spike 32 connected to a single linear actuator 34. One skilled in the art will however understand that, in an alternative embodiment (not shown), the spearing end effector 30 could include a plurality of linear actuators 34 each connected to a corresponding spike 32 and/or a plurality of spikes 32 connected to a single linear actuator 34. In addition, in an embodiment (not shown), the robotic spearing device 10 could include a plurality of robotic manipulators 20 each having a spearing end effector 30 and working simultaneously and collaboratively to sort a plurality of selected items 12, from the mass of items 14.

In the embodiment shown, the spearing end effector body 31 of the spearing end effector 30 also includes a release plate 36 having an item release surface 38, at a front end 31a thereof, and a mounting plate 39 at a rear end 31b thereof.

The release plate 36 includes an aperture 37 (or through hole) extending therethrough and being sized, shaped and positioned to allow the spike 32 to move through the release plate 36, when configured in the extended configuration (see FIG. 2A). The release surface 38 of the release plate 36 faces forwardly, at the front of the spearing end effector 30, to engage the selected item 12 engaged to the spike 32, when the spike 32 is moved from the extended configuration to the retracted configuration, as will be described in more details below. In the embodiment shown in FIG. 2B, the release plate 36 and the item release surface 38 thereof are substantially perpendicular to the longitudinal axis L of the spike 32. One skilled in the art will however understand that, in an alternative embodiment (not shown) the release plate 36 and/or the item release surface 38 thereof could be angled relative to the longitudinal axis L of the spike 32 of an angle different than about 90°. In other words, the release plate 36 and/or the item release surface 38 thereof could extend differently than substantially perpendicular to the longitudinal axis L of the spike 32.

The mounting plate 39 is configured to mount the spearing end effector 30 to a connecting section at the distal end 20b of the robotic manipulator 20. In an embodiment, the release plate 36 and/or the mounting plate 39 are integral to the spearing end effector body 31 (i.e. the spearing end effector body 31 and at least one of the release plate 36 and the mounting plate 39 can be manufactured as a unitary component). One skilled in the art will understand that, in an alternative embodiment, the release plate 36 and/or the mounting plate 39 can also be distinct components permanently or removably mounted to the spearing end effector body 31

In an embodiment, the spearing end effector 30 further includes a propeller 40. In the course of the present description, the term "propeller" is used to define a component configured to eject and propel the selected item 12 away from the spearing end effector 30, i.e. a component configured to impart a sudden and sufficient driving force on the selected item 12 to drive the selected 12 away from the spearing end effector 12, in a propelling direction P.

As will be described in more details below, the propeller 40 is selectively activatable to propel (or project) an item 12, away from the spearing end effector 30 and in the desired propelling direction P. In an embodiment, the propeller 40 is selectively activated when the spike 32 is being moved from the extended configuration to the retracted configuration, or shortly after the spike 32 has been moved to the retracted configuration, as will be described in more details below. The propeller 40 includes a propeller outlet 41 positioned proximate to the item release surface 38 of the release plate 36, such that it provides the maximal impulse to items 12 abutted thereagainst. In an embodiment, the propeller outlet 41 can be open in the item release surface 38 of the release plate 36.

In an embodiment, the outlet 41 of the propeller 40 is a nozzle and the propeller 40 uses a compressed air jet flowing through the nozzle in a direction substantially perpendicular to the longitudinal axis L of the spike 32, to propel the selected item 12 impaled on the spike 32. One skilled, in the art will understand that, in an alternative embodiment (not shown), the propeller 40 could differ from the embodiment shown. For example and without being limitative, the propeller 40 could include multiple outlets 41 (e.g. multiple nozzles producing multiple air jets) to propel the item 12 impaled on the spike 32, a fluid other than compressed air could flow out of the one or more outlet(s) 41 to propel the selected item 12, the propeller 40 could be of the mechanical type where a mechanical pusher (not shown) swiftly bursts in and out of the outlet 41 of the propeller 40 (and swiftly bursts forwardly of the item release surface 38 of the release plate 36) to briefly engage the selected item 12 impaled in the spike 32 and propel it, etc. Moreover, in an embodiment, multiple propellers 40 could be provided, with the multiple propellers 40 cooperating to perform the propelling of the item 12 in the propelling direction P.

In the embodiment shown, the propeller 40 is fixedly mounted to the release plate 36, proximate to the aperture 37, with the propeller outlet 41 being open in the item release surface 38 of the release plate 36. One skilled in the art will however understand that, in an alternative embodiment (not shown) the propeller 40 could be mounted to a different component than the release plate 36. For example and without being limitative, the propeller 40 could be mounted to a different section of the spearing end effector body 31, could be directly mounted to the distal end 20b of the robotic manipulator 20 (without being mounted to the spearing end effector 30), etc.

Moreover, it will be understood that, in an embodiment (not shown) the propeller 40 can be movably mounted. For example and without being limitative, the propeller 40 can be mounted on an actuator moving the propeller 40 and positioning the propeller 40 to perform the propelling action of the item 12 in the desired propelling direction P. In such an embodiment, the propeller 40 can be configured between an inactive configuration where the propeller 40 is positioned not to impede the spearing action of the spike 32 with the selected item 12 and an active configuration where the propeller 40 is positioned to impart the desired driving force on the item 12 and to propel the item 12 in the propelling direction P. In an embodiment, the propeller 40 is positioned with the propeller outlet 41 proximate to the item release surface 38 of the release plate 36, when configured in the active configuration.

In the embodiment shown in FIG. 2B, the propelling direction P in which the selected item 12 is propelled by the propeller 40 is a direction substantially parallel to the longitudinal axis L of the spike 32 and substantially opposite to a retraction direction R in which the spike 32 is moved during its retraction towards the retracted configuration. In the embodiment shown in FIG. 2B, where the item release surface 38 of the release plate 36 is substantially perpendicular to the longitudinal axis L of the spike 32, the propelling direction P in which the item 12 is propelled by the propeller 40 is also the direction substantially perpendicular to the item release surface 38 of the release plate 36. One skilled in the art will however understand that, in alternative embodiments (not shown), the propelling direction P may be different from the direction of the embodiment shown. In fact, the propelling direction P can be any direction which allows the selected item 12 to be projected towards a desired target, such as a corresponding sorting receptacle. In an embodiment, the propelling direction P in which the selected item 12 is propelled by the propeller 40 can be substantially perpendicular to the longitudinal axis L of the spike 32.

In an embodiment, the robotic spearing device 10 also includes a machine vision system 50 configured to acquire images of the mass of items 14 and process the images acquired to identify the selected item 12 to be retrieved from the mass of items 14 for subsequent sorting thereof. For example and without being limitative the machine vision system 50 can be configured to identify the selected item 12, generate data relative to the position of the selected item 12 and output the data relative to the position of the selected item 12 in the mass of items 14. In an embodiment, the machine vision system 50 can also be configured to generate data relative to the orientation and/or volume of the selected item 12 and output the data relative to the orientation and/or volume of the selected item 12 in the mass of items 14.

For example and without being limitative, in an embodiment, the machine vision system 50 can include at least one sensor 52 for acquiring the images of the mass of items 14, with the sensor 52 being in data communication with a computer (not shown) (or computing unit) having a processor (not shown) and memory (not shown) storing thereon instructions to perform the processing of the acquired images, to correctly identify the selected item 12 and determine the position (and possibly the orientation and/or volume) of the selected item 12 in the mass of items 14. In an embodiment, the sensors 52 and corresponding components required for acquiring the images (e.g. camera, lenses, lighting components, etc.) are specifically designed to favor the differentiation of the selected item 12 (i.e. to differentiate the items having the desired characteristics representative of the selected item 12, from other items of the mass of items 14) during the processing of the acquired images. For example and without being limitative, the sensor 52 of the machine vision system 50 can include a camera, an X-ray vision system, a metal detector, etc. One skilled in the art will understand that, in alternative embodiments, the machine vision system 50 could differ from the machine vision system 50 described above, provided that the machine vision system 50 allows the identification of the selected item 12 (i.e. identification of an item of a specific category of items) from the mass of items 14 and the determination of the position (and possibly the orientation and/or volume) of the selected item 12. For example and without being limitative, the processor and memory for performing image processing can be integrated to the sensor 52, etc.

As will be described in more details below, in an embodiment, the machine vision system 50 is in data communication with an electronic control system (not shown) controlling the manipulator 20 and provides the data relative to the position (and possibly the orientation and/or volume) of the selected item 12 to the electronic control system, in order to guide the motion of the manipulator 20 and the positioning (and possibly the orientation) of the spearing end effector 30 thereof. Such positioning (and possibly the orientation) of the manipulator 20 and its spearing end effector 30 allows the spearing end effector 30 to engage and capture the selected item 12 in the mass of item 14 (as the spike 32 of the spearing end effector 30 is moved from the retracted configuration to the extended configuration), with minimal impact on the positioning of the items neighbouring the selected item 12 captured by the spearing end effector 30. In an embodiment, the capture of the item 12 is performed by initially engaging the item release surface 38 of the release plate 36 on a surface of the selected item 12, before the spike 32 of the spearing end effector 30 is moved from the retracted configuration to the extended configuration.

The position of the selected item 12 in the mass of items 14 can be a static position, in cases where the mass of items 14 remains static. In other cases, where the mass of items 14 is in motion (for example and without being limitative, see FIG. 1, where the mass of items 14 is moving along a displacement axis X on a conveyor belt 16) the position of the selected item 12 in the mass of items 14 is a moving spatial position, taking into account the speed of motion of the mass of items 14 and the direction of the displacement of the mass of items 14. In the latter alternative, the motion of the manipulator 20 (or of the links 22 thereof) and/or the positioning of the spearing end effector 30 can be synchronized with the movement of the mass of items 14, to move the spearing end effector 30 simultaneously and in synchronicity with the mass of items 14, at least during the engagement and capture of the selected item 12 in the mass of items 14 (i.e. at least during the time period where the spike 32 of the spearing end effector 30 is moved from the retracted configuration to the extended configuration and the engagement of the spike 32 of the spearing end effector 30 with the corresponding selected item 12 is performed), to provide the above-mentioned minimal impact on the positioning of the items neighboring the selected item 12 captured by the spearing end effector 30. In an alternative embodiment (not shown), the robotic spearing device 10 could also include additional or alternate components to allow the movement of the spearing end effector 30 simultaneously and in synchronicity with the mass of items 14, at least during the engagement and capture of the selected item 12. For example and without being limitative, the manipulator 20 could be mounted on an additional moving assembly (not shown) (e.g. a linear motion assembly moving synchronously with the conveyor belt 16 during the engagement and capture of the selected item 12), in order to move the manipulator 20 simultaneously and in synchronicity with the mass of items 14 and hence allow the spearing end effector 30 to move similarly as the mass of items 14 (i.e. to move substantially in the same direction and at the same speed), during such engagement and capture of the selected item 12.

In an embodiment, the robotic spearing device 10 includes an electronic control system (not shown) operatively connected to (or in data communication with) the manipulator 20 (and consequently operatively connected to the actuator 34 and propeller 40 of the spearing end effector 30 of the manipulator 20) such that the operations of the components of the robotic spearing device 10 for locating the selected item 12, capturing the selected item 12 in the mass of items 14, moving the selected item 12 towards the sorting receptacle (not shown) and releasing (or propelling) the selected item 12 in the sorting receptacle (not shown), are synchronized. As mentioned above, in an embodiment, the electronic control system can receive data relative to the position (and possibly the orientation and/or volume) of the identified selected item 12 from the machine vision system 50, to control the manipulator 20 and perform the specific required motion of the manipulator 20 and its spearing end effector 30, for each selected item 12 to be sorted.

The robotic spearing device 10 having been described in detail above, operation of the robotic spearing device 10 to perform sorting of a selected item 12 will now be described in more details below.

In operation, upon identification of a selected item 12 to be sorted and the static or moving spatial position (and possibly its orientation) of the selected item 12 by the machine vision system 50, the links 22 of the manipulator 20 are moved to position (and possibly orient) the spike 32 of the spearing end effector 30 towards the selected item 12. The positioning (and possibly the orientation) of the spike 32 of the spearing end effector 30 is performed to position the item release surface 38 of the release plate 36 of the spearing end effector 30 proximate to the selected item 12. In an embodiment, during the positioning (and possibly the orientation) of the spike 32 of the spearing end effector 30, the item release surface 38 of the release plate 36 is abutted against a surface of the selected item 12.

As mentioned above, in an embodiment where the mass of items 14 is in motion, the motion of the manipulator 20 and the positioning (and possible orientation) of the spearing end effector 30 by the manipulator 20 can be adjusted to continuously move the spearing end effector 30 simultaneously and synchronously with the mass of items 14, at least during the engagement and capture of the selected item 12, to create a minimal impact on the positioning of the items in the vicinity of the selected item 12.

To capture the selected item 12, the linear actuator 34 of the spearing end effector 30 is activated, thereby moving the spike 32 from the retracted configuration (see FIG. 2B) to the extended configuration (see FIG. 2A) and therefore impaling the selected item 12 onto the spike 32. Subsequently, the spike 32 can be partially retracted towards the retracted configuration and/or the spearing end effector 30 can be moved by the motion of the manipulator 20, to extract the item 12 from the mass of items 14.

Subsequently, further displacement of the spearing end effector 30 can be provided by the motion of the manipulator 20, to position the item 12 such that it can be ejected towards the sorting receptacle (not shown) and ejection of the selected item 12 engaged by the spike can be achieved. In an embodiment, the ejection of the selected item 12 is performed by retraction of the spike 32 in the retraction direction R, towards the retracted configuration (see FIG. 2B) and activation of the propeller 40 to propel the item 12 in the propelling direction P and into the sorting receptacle (not shown). During the retraction of the spike 32, the selected item 12 abuts onto the item release surface 38 of the release plate 36 to block the movement of the selected item 12 and prevent further rearward movement thereof, therefore allowing the spike 32 to be removed from the item 12.

In an embodiment, before activating the propeller 40, the propeller 40 is moved from its inactive configuration where the propeller 40 is positioned not to impede the spearing action of the spike 32 with the selected item 12 to its active configuration where the propeller 40 is positioned to impart the desired driving force on the item 12 and to propel the item 12 in the propelling direction P upon activation thereon.

In an embodiment, the activation of the propeller 40 is performed while the item 12 is still at least lightly impaled on the spike 32 (i.e. as the item is still engaged to the spike 32 and before the spike 32 is retracted by the linear actuator 34 sufficiently to disengage completely from the item 12) and while the selected item 12 is abutted against the item release surface 38. Activation of the propeller 40 while the item 12 is still lightly impaled on the spike 32 can help propelling the item 12 in the desired propelling direction P, as it can help providing substantially optimal positioning of the selected item 12 when the propeller 40 is activated (i.e. it can help preventing the propeller 40 from performing propelling of an item 12 that is misplaced or misoriented). Moreover, activation of the propeller 40 while the selected item 12 is abutted against the item release surface 38 can help maximizing the impulse provided by the propeller 40 being activated, by minimizing the distance between the selected item 12 and the outlet 41 of the propeller 40 when the propeller 40 is activated.

In an alternative embodiment, the activation of the propeller 40 can also be performed immediately following the item 12 being released from the spike 32 (i.e. a short period of time (e.g. between 1 millisecond and 1 second) after the item is released from the spike 32, as a result of the spike 32 being retracted by the linear actuator 34 sufficiently to disengage completely from the item 12) and while the item 12 begins falling towards the ground. In an embodiment, activation of the propeller 40 following the item 12 being released from the spike 32 can help increasing the rapidity of the movement of the item 12 towards the corresponding sorting receptacle and the sorting of the item 12 therein, as it can minimize the required displacement of the spearing end effector 30 (for example and without being limitative in cases (not shown) where the propelling direction P is substantially perpendicular to the longitudinal axis L of the spike 32).

In an embodiment, following the activation of the propeller, the propeller 40 is returned to the inactive configuration where the propeller 40 is positioned not to impede the spearing action of the spike 32 with the selected item 12.

The combination of the retraction of the spike 32 towards the retracted configuration and the activation of the propeller 40 during the ejection of the selected item 12 is advantageous over only the retraction of the spike 32 towards the retracted configuration as it helps reducing the cycle time for the sorting of each item 12 by the robotic spearing device 10.

It is appreciated that several variations can be foreseen to the above-described sequence, provided that a selected item 12 is extracted from the mass of item 14, by the spike 32 of the spearing end effector 30 impaling the item 12 and is subsequently sorted by the spearing end effector 30 being positioned towards a corresponding sorting receptacle and the item 12 being released therein, for example through the combination of the retraction of the spike 32 towards a retracted configuration and a propulsion of the item 12 by the activation of a propeller 40 propelling the item 12 in a propelling direction P.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

What is claimed is:

1. A robotic spearing device for performing capture and sorting of a selected item from a mass of items, the robotic spearing device comprising:
   a robotic manipulator having a spearing end effector mounted at an end thereof, the spearing end effector comprising:
      a spearing end effector body;
      at least one spike configurable between a retracted configuration where the spike is entirely located inside the spearing end effector body and an extended configuration where the spike extends outwardly from the spearing end effector body, the at least one spike being engageable to the selected item when configured in the extended configuration; and
      at least one linear actuator having the at least one spike mounted thereon and being movable to configure the at least one spike between the retracted configuration and the extended configuration;
   a machine vision system configured to acquire images of the mass of items, to process the images acquired to identify the selected item from the mass of items and to determine the position of the selected item; and
   an electronic control system in data communication with the machine vision system and the manipulator, the electronic control system receiving data relative to the position of the selected item from the machine vision system and controlling the manipulator to move the manipulator and position the spearing end effector thereof to allow engagement of the spike of the end effector with the selected item when the spike is moved from the retracted configuration towards the extended configuration.

2. The robotic spearing device of claim 1, wherein the mass of items is in motion, the electronic control system being configured to displace the spearing end effector simultaneously and synchronously with the mass of items, at least during a time period where engagement of the spike of the spearing end effector with the selected item is performed.

3. The robotic spearing device of claim 1, wherein the spearing end effector further comprises a propeller selectively activatable to propel the selected item in a propelling direction, during an ejection of the selected item from the spearing end effector.

4. The spearing end effector of claim 3, wherein the propeller is configurable between an inactive configuration where the propeller is positioned not to impede the engagement of the spike with the selected item and an active configuration where the propeller is positioned to propel the selected item in the propelling direction.

5. The robotic spearing device of claim 3, wherein the spearing end effector body comprises an item release surface engageable to the selected item engaged to the at least one spike, when the spike is moved from the extended configuration to the retracted configuration.

6. The robotic spearing device of claim 5, wherein the propeller comprises a propeller outlet, the propeller outlet being positionable proximate to the item release surface.

7. The robotic spearing device of claim 4, wherein the propeller uses one of a compressed air jet and a mechanical pusher to propel the selected item in the propelling direction.

8. A method for performing capture and sorting of a selected item from a mass of items, the method comprising:
   identifying the selected item in the mass of items;
   determining, by an electronic control the position of the selected item;
   positioning a spearing end effector according to the position of the selected item to allow subsequent impaling of the selected item with a spike of a spearing end effector of a manipulator, with minimal impact on the neighboring items of the mass of items;
   impaling the selected item, with the spike of the spearing end effector of the manipulator;
   extracting the selected item from the mass of items by moving the spearing end effector with the selected item impaled thereon; and
   ejecting the selected item in a corresponding sorting receptacle.

9. The method of claim 8, wherein the spearing end effector includes a spearing end effector body and wherein the step of ejecting the selected item in the corresponding sorting receptacle comprises retracting the spike in the spearing end effector body and activating a propeller propelling the selected item in a propelling direction.

10. The method of claim 9, wherein the step of positioning the spearing end effector according to the position of the selected item comprises abutting the item release surface of the spearing end effector body on a surface of the selected item.

11. The method of claim 9, wherein the step of ejecting the selected item further includes abutting the selected item onto an item release surface of the spearing end effector body, as the spike is being retracted in the spearing end effector body.

12. The method of claim 9, wherein the step of activating a propeller propelling the selected item in a propelling direction comprises moving the propeller from an inactive configuration to an active configuration.

13. The method of claim 9, wherein the step of activating the propeller propelling the selected item in the propelling direction comprises activating a compressed air jet propelling the selected item.

14. The method of claim 9, wherein the step of activating the propeller propelling the selected item in the propelling direction comprises activating a mechanical pusher propelling the selected item.

\* \* \* \* \*